May 24, 1966   W. H. SQUIER   3,252,732
LAMINATED LINING MATERIAL
Filed Jan. 29, 1963
FIG.1
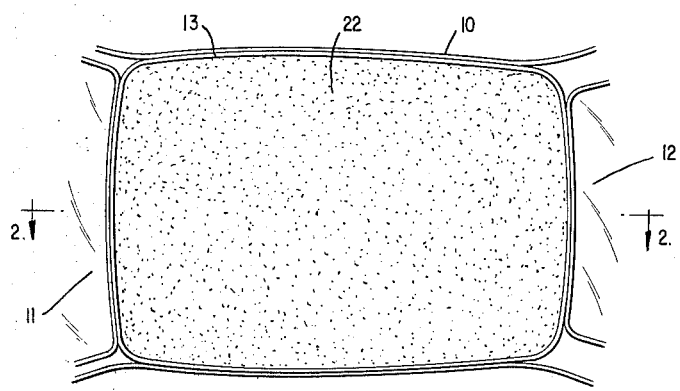
FIG.2
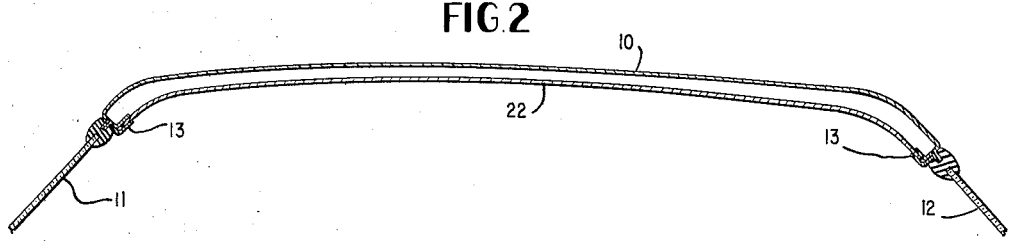
FIG.3 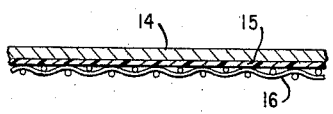   FIG.4 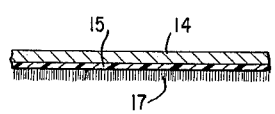   FIG.5 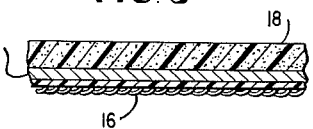
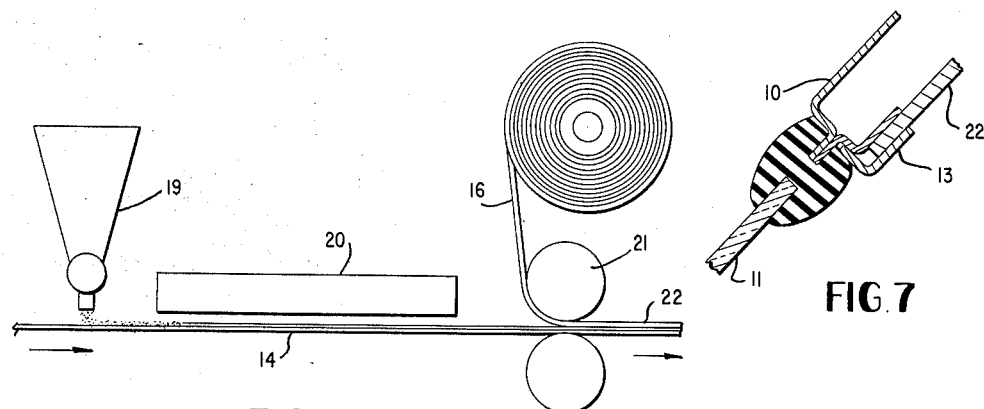
FIG.6    FIG.7
INVENTOR.
WILLIAM H. SQUIER
BY
Browne, Schuyler & Beveridge
ATTORNEYS United States Patent Office 3,252,732
Patented May 24, 1966

3,252,732
LAMINATED LINING MATERIAL
William H. Squier, Taylors, S.C., assignor to J. P. Stevens, and Co., Inc., New York, N.Y., a corporation of Delaware
Filed Jan. 29, 1963, Ser. No. 254,700
16 Claims. (Cl. 296—137)

The present invention relates to a laminated article for use as the lining material in motor vehicles, and to a method of making said article. More particularly, the present invention relates to a laminated article for use as the headliner in motor vehicles which does not require a separate molding step prior to installation and to a novel method for forming a laminated headliner.

In the past, various materials have been used as the headliner in motor vehicle interiors. Such materials as woven cloth fabric, plastic films, and plastic coated cloth are most often employed for the interior trim of motor vehicles, including the headliner. In conventional installations, the headliner cloth or fabric is held up toward the roof of the vehicle to form the interior ceiling by a plurality of metal wires or rods, called listing bows, which are bent or bowed into the desired arc to fit closely underneath the roof of the vehicle and which extend transversely between the opposite side walls of the vehicle body underneath the roof. The opposite ends of the listing bows are secured to the respective opposite sides of the vehicle by sliding into a groove in a rod running on each side of the vehicle, the rods being perpendicular to the bows and fastened by screws at each end. The headliner fabric material is either glued, tacked or nailed to the listing bows.

There are many disadvantages associated with such methods. The fabric material is a relatively costly item and frequently is torn or damaged when tacked or nailed into position. This necessitates removal and a new installation requiring more materials and labor.

Since the conventional headliner material is not self-supporting it must be fastened to the listing bows at many places, which requires many hand operations. Because the operation must be done carefully, it takes a relatively long period of time. In addition, the listing bows which support the conventional headliner fabric are either welded into the roof or must be separately installed in special attachment devices. These items add further expense to the production costs of the vehicle. Other types of headliners, such as those formed from a plurality of panels made of composition board, e.g. Masonite, or the like have also been suggested in the past. However, the difficulty associated with these is the need for special and complex supporting means which are frequently more expensive than the more conventional cloth headliners.

As can be appreciated, these methods of installation involve many hand-labor operations which become costly. Hence, the headliner becomes an item of disproportionately high cost. In addition, it is difficult to maintain close quality control on the installation of the fabric headliner.

In an attempt to overcome some of these drawbacks, other methods have been developed, the most significant being in the use of plastic materials. However, it is frequently necessary to subject the plastic substances which are employed as interior headliners to a molding operation which is both costly in the equipment required, and time-consuming. In addition, the plastic materials which have been used heretofore have been relatively expensive. The woven fabrics which have been used in the past for head-lining have been subject to deterioration due to the accumulation of dirt, as well as ultraviolet degradation which causes them to become unsightly in appearance and therefore adversely affect the resale value of the vehicle. Moreover, when plastic materials have been used in the past it has been difficult to provide a means for a rapid and simple lamination thereof, and as a result such plastic materials have not been completely commercially successful.

Accordingly, it is an object of this invention to provide a lining material for motor vehicles which avoids the shortcomings and disadvantages associated with conventional materials.

It is a further object of this invention to provide a motor vehicle headliner which may be easily and rapidly installed within the vehicle.

It is another object of this invention to provide a headliner for motor vehicles which can be simply and quickly removed for low-cost replacement when desired.

It is a further object of this invention to provide one-piece motor vehicle headliners which are constructed of low-cost materials and which require a minimum of installation equipment and crews.

It is a further object of this invention to provide motor vehicle headliners which may be readily washed or cleaned.

In attaining the objects of this invention, one feature resides in having the lining material comprise a laminate of a kraft paperboard having a fused resin surface and a decorative material adhered to the resin surface.

Another feature of this invention resides in making the headliner of a one-piece resilient laminate which is snapped into position in the interior of the motor vehicle and assumes the configuration of the roof of the vehicle, thereby eliminating the necessity and cost of molding the headliner.

The above objects and features as well as others will become readily apparent to those skilled in the art from the description which follows below taken in conjunction with the accompanying drawing, wherein:

FIG. 1 is an interior plan view of the vehicle roof with the headliner installed and means for holding the headliner;

FIG. 2 is a longitudinal cross-sectional view of the roof of the vehicle with the headliner and means for supporting the headliner;

FIG. 3 is a cross-sectional view of a portion of the preferred headliner;

FIG. 4 is a cross-sectional view of a portion of the flocked headliner;

FIG. 5 is a cross-sectional view of a portion of a cellular polyurethane foam-backed headliner of FIG. 3;

FIG. 6 is a diagrammatic view illustrating the process of this invention; and

FIG. 7 is a cross-sectional view of a portion of the supporting means for the headliner.

In the drawings an automobile metal roof of conventional design is indicated by the numeral 10, the windshield is indicated by the numeral 11, and the rear window as 12. Opposite ends of the roof merge respectively into a front wall defined by the windshield and the rear wall defined by the rear window. Opposite sides of the roof merge into the respective side walls which are provided with doors and windows. Headliner supporting means 13 are provided in the form of a rim, series of brackets, or other suitable means, above the rear window, above the windshield, and above the doors and side windows of the vehicle. The resilient headliner laminate 22 of this invention is sprung or snapped into position under the roof 10 of the vehicle and is held in place by the supporting means 13.

In carrying out the present invention, a relatively heavy gauge kraft paperboard 14 is coated with a polyethylene resin 15. Any heavy guage kraft paperboard which is capable of producing the desired results may be employed, with the preferred dimensions varying within the range of from about 50 mils to about 100 mils in thickness. The resin is most conveniently in the form of powder, and in the preferred embodiment powdered polyethylene is used, although extruded resin also may be employed. Thereafter, or simultaneously with the coating step, heat is applied to fuse the polyethylene resin to the kraft paperboard and form a uniform, continuous, and water-impervious surface on the kraft paperboard. The thickness of the resin coating can be varied as desired, and it has been found that as little as 0.75 mil to several mils is sufficient to obtain a good bond between the paperboard and the decorative material 16 which will be applied thereto. The process is readily adapted to a continuous operation by simply placing the kraft paperboard, which may be obtained in a continuous roll, on a conveyer moving at a suitable speed while the polyethylene resin particles are continuously fed from a hopper 19 onto the moving belt of kraft paperboard 14. The coated kraft paperboard then moves into the delivery end of oven 20 having suitabel heating means, as for example a bank of infra-red lamps, whereby the applied heat causes the polyethylene to melt and fuse to the paperboard.

The decorative fabric material 16 which is subsequently fused to the kraft paperboard is usually prepared in a separate operation, and may be woven, non-woven, or knitted fabric formed of animal, vegetable, mineral, or synthetic fibrous material. Blends of these materials may also be employed. Paper, jute, and glass fibers are examples of suitable materials. Because of economies that can be effected through its use, paper is most commonly employed. The above materials are oriented to form a pleasing pattern, geometric configuration, or random distribution, and may be in one or more colors. The decorative surface forms a part of the completed headliner panel which faces the interior of the motor vehicle and is visible to the occupants thereof. Prior to the step of fusion to the kraft paperboard, the decorative fabric is coated with polyethylene resin of a thickness of about 1 to 4 mils. The resin coating may be applied in any conventional manner, preferably by extrusion coating, and if a colored headliner is desired, a colored resin and/or a colored decorative fabric may be employed to achieve the desired result. The resin thus performs two functions; first, it serves functionally to bond the decorative fabric element to the polyethylene-coated kraft paperboard, and, second, it serves decoratively as part of the styling effect when the material of the decorative fabric is such that the resin is viewable therethrough.

In a similar manner, the decorative material employed in the formation of the headliner laminate may be in the form of a flocked fabric 17. The first step in the preparation of a flocked fabric is to coat a substrate fabric consisting of woven, non-woven, or knitted materials, as set forth above, with a suitable adhesive. The adhesive-coated fabric is then passed into an electrical field between oppositely charged plates. Precut electrically charged material, which may be natural or synthetic fibers, are deposited onto the adhesive-coated surface of the substrate, and the individual fibers are caused to assume and permanently retain a vertical position. Alternatively, the precut fibers, without being electrically charged, may be simply deposited onto the substrate whereupon they assume a horizontal position. Thus, by employing differently colored fibers it is possible to deposit a mat of randomly distributed fibers giving a pleasing multicolored appearance.

The substrate for the flocked fabric can be paper, jute, and the like, which are inexpensive materials. The fabric is relatively thin compared with the kraft paperboard, being only about 4 to 8 mils in thickness. A coating of polyethylene of sufficient thickness (e.g. 0.75 mil minimum) is applied to the back of the flocked fabric which functions subsequently to effect the heat seal to the polyethylene-coated kraft paperboard.

After the decorative fabric is coated with polyethylene, it is caused to converge with the polyethylene coated surface of the kraft paperboard. Sufficient pressure is then applied to fuse the polyethylene coated decorative material and the polyethylene coated kraft paperboard together thereby forming a permanent polyethylene bond. While the pressure is sufficient to form a durable bond, it is not sufficient to cause any disfiguration of the decorative material.

Alternatively, the two polyethylene-coated materials may be brought into contact under a chilled pressure roller 21, which causes the polyethylene resin to fuse, thereby effecting the bonding of the two materials. The decorative material 16, which in the preferred embodiment consists of a knit paper fabric precoated with a colored polyethylene resin coating of about 1 to 4 mils in thickness, need not be heated prior to the fusion bonding step with a kraft board, since the melted polyethylene resin on the kraft paperboard fuses sufficiently to the thin film of resin on the precoated decorative fabric to produce the desired bonded result. Because of the fusion of the polyethylene resin, the two elements of the headliner laminate adhere tenaciously to each other and a secure, durable bond is obtained. If desired, however, the polyethylene coated decorative material may be in a heated condition prior to contacting the kraft paperboard.

After the laminated product 22 has cooled sufficiently, the flat piece is die-cut to the desired configuration of the motor vehicle roof. Similarly, the laminated product can be die-cut during the pressure lamination step in the production of the laminated product.

The processes described above are eminently suited for a continuous operation if so desired. The kraft paperboard and the decorative material can each be obtained in a long continuous roll. The polyethylene resin may be continuously fed from a hopper device 19 to provide a means for smooth, substantially continuous and substantially uniform application of the resin to each of the two elements of the laminate.

Although the previously described method of manufacturing the laminated headliner of this invention is preferred, it is within the scope of this invention to employ pre-cut lengths of kraft paperboard as the starting material. In this alternate method of manufacturing, precut lengths of kraft paperboards, 75 mils in thickness for example, are precoated with a layer of approximately 0.75 mil of polyethylene of the low density type (specific gravity—.916–.925). The coated board is then placed on the lower plate of a two-plate flat, cold-mold press. The decorative fabric, e.g., knit paper, is placed on top of the kraft paperboard in the position desired for the final laminate. A bank of infrared lights mounted on a portable guide track then moves into position over the unfused laminate and fusion occurs at the interface of the two components. The heat treatment is at a temperature of approximately 490° F. for a period of about 1.5 minutes, after which the bank of heating lights is moved out of position and the upper plate of the press moves into position with the lower plate, thus compressing the components at about 3 p.s.i.

The laminated product produced according to the invention is shipped in the flat state to the automotive assembly plant where the workers on the assembly line install it in the vehicle. The headliner 22 is sprung or snapped into position by simply pushing the laminate into the roof of the automotive vehicle 10 above the rim supports 13. To illustrate the installation method of the one-piece, snap-in headliner 22 of this invention, the following steps would be carried out by a worker at the assembly line. First, the back wall section is inserted into the rim 13 above the rear window 12. The left side of the headliner, facing the rear, is inserted into the rim above the doors of the vehicle. Following this, the operator then pulls down the laminated headliner, and flexes the right side into the rim supports over the doors at the right side. Then simultaneously he pushes the entire laminate up toward the roof of the vehicle 10, and guides the front section into the front rim 13 above the windshield 12. With the proper thickness of the laminate, no further means for the headliner is necessary, since the headliner laminate is supported by the arch of the laminate, itself. In those vehicles equipped with a center dome light, an appropriate cut out is made in the laminate. By the method described above, a headliner of this invention can be installed in as little as 60 seconds, thus presenting a considerable saving in time and labor over conventional headliner installations. However, if desired, additional support can be obtained by simply attaching the laminated headliner at the center dome light in those vehicles equipped therewith.

The one-piece, snap-in headliner of this invention therefore does away with all molding operations which were necessary heretofore in the installation of plastic headliners. Substantial savings in equipment and operating time are thereby effected.

When the original headliner becomes dirty, it can easily be washed or cleaned with soap and water. If desired, it can quickly and simply be removed and a new headliner, which may be bought from the dealer, can be readily installed.

Although the preceding examples show the use of decorative paper fabrics and flocked materials, other substances, such as fiber glass fabrics precoated with polyethylene, may also be employed as the decorative element. The preferred resin for the purposes of this invention is polyethylene because of its low cost, good properties of heat resistance and stability, as well as good low-temperature properties. It also maintains its flexibility with age and is resistant to crazing and cracking. However, other thermoplastic resins such as the vinyls, polypropylene, mixtures of polyethylene and polypropylene, and the like, may also be employed according to this invention with satisfactory results. If it is desired to include an insulating backing for the headliner and a material which will act to give a vibration-dampening effect, an expandable resin powder may be employed, or a foamed material, such as a cellular polyurethane, designated as 18 in FIG. 5, may be laminated to the kraft paperboard.

Although emphasis throughout the foregoing has been on headliners, the laminated product of this invention is not limited for use as a headliner material, but can be employed as luggage compartment linings, interior door panels, interior panels for trucks and station wagons, and similar applications.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. For use in combination with a motor vehicle, the improvement which comprises a panel for use in a vehicle, said panel comprising a substantially rigid and dimensionally stable composite structure which comprises a relatively heavy kraft paperboard provided with a fused polyethylene resin coating on one surface thereof, and a decorative material coated with polyethylene resin, the polyethylene-coated surface of the decorative material being permanently fused to the polyethylene surface of the said kraft paperboard.

2. In combination with a motor vehicle body having a roof, opposed longitudinal side walls, opposed end walls and opposed headliner-supporting means located on the inward side of said walls and below said roof, the improvement which comprises a substantially rigid and dimensionally stable, one-piece, snap-in headliner panel for said motor vehicle comprising a relatively heavy gauge, dimensionally stable, resilient, self-supporting kraft paperboard having a thermoplastic resin fused on one surface thereof, and a thermoplastic resin-coated decorative material next adjacent thereto, the thermoplastic resin-coated surface of the decorative material being permanently fused to the said thermoplastic resin surface of the paperboard, said headliner panel being bowed upwardly to assume a compound curvature to conform generally to the curvature of the roof when sprung into position between the said supporting means, below the roof and disposed thereunderneath with the decorative surface facing the interior of the motor vehicle.

3. The combination of claim 2, wherein the decorative material is a knit paper fabric.

4. The combination of claim 2, wherein the decorative material comprises a flocked fabric.

5. The combination of claim 2, wherein the decorative material is a woven fabric of glass fiber.

6. The combination of claim 2, wherein the decorative material is a non-woven paper fabric.

7. The combination of claim 2, wherein the kraft paperboard is provided with a cellular polyurethane backing bonded to the surface of the said paperboard opposite that which is coated with thermoplastic resin.

8. In combination with a motor vehicle body having a roof, opposed longitudinal side walls, opposed end walls and opposed headliner-supporting means located on the inward side of said walls and below said roof, the improvement which comprises a substantially rigid and dimensionally stable, one-piece, snap-in headliner panel for said motor vehicle comprising a relatively heavy gauge, dimensionally stable, resilient and self-supporting kraft paperboard having a polyethylene resin fused on one surface thereof and a polyethylene-coated decorative fabric material next adjacent thereto, the polyethylene-coated surface of the decorative material being permanently fused to the said polyethylene surface of the paperboard, said headliner panel being bowed upwardly to assume a compound curvature to conform generally to the curvature of the roof when sprung into position between said supporting means, below the roof and disposed thereunderneath with the decorative surface facing the interior of the motor vehicle.

9. The combination of claim 8 wherein the decorative material is a knit paper fabric.

10. The combination of claim 8, wherein the decorative material is a flocked fabric.

11. The combination of claim 8 wherein the decorative material is a woven fabric of glass fibers.

12. The combination of claim 8 wherein the decorative material is a non-woven paper fabric.

13. The combination of claim 8, wherein the kraft paperboard is provided with a cellular polyurethane backing bonded to the surface of the said paperboard opposite that which is coated with polyethylene resin.

14. The method of lining the interior roof of a motor vehicle having a roof, opposed longitudinal side walls, opposed end walls and opposed headliner-supporting means located on the inward side of said walls and below said roof, consisting essentially of arching a substantially rigid, dimensionally stable, one-piece composite flat headliner structure comprising a relatively heavy gauge, dimensionally stable, resilient and self-supporting kraft paperboard having a polyethylene resin-fused on one surface thereof and a polyethylene resin-coated decorative material next adjacent thereto and permanently fused to the said polyethylene surface of the paperboard; into and under the roof of said vehicle to bow upwardly and to assume a compound curvature to conform generally to the curvature of the roof when arched into position between the said headliner-supporting means.

15. A substantially rigid and dimensionally stable composite structure comprising a relatively heavy gauge kraft paperboard panel provided with a fused layer of thermoplastic resin and a next adjacent layer of a thermoplastic resin-coated decorative material permanently fused to said thermoplastic resin surface of the kraft paperboard, said composite structure having the paperboard on one surface and the decorative material on the other surface.

16. A substantially rigid and dimensionally stable, one-piece, snap-in headliner panel for a motor vehicle body, said vehicle body having a roof, opposed longitudinal side walls, opposed end walls, and opposed headliner-supporting means located on the inward side of said walls and below said roof; comprising a relatively heavy gauge kraft paperboard having a fused polyethylene resin layer on one surface thereof and a polyethylene-coated decorative material next adjacent thereto and permanently fused to said polyethylene resin surface of the kraft paperboard, said headliner panel having the paperboard on one surface thereof and the decorative material on the other surface, said headliner in said vehicle body having substantially the same configuration as the roof of said vehicle body.

References Cited by the Examiner

UNITED STATES PATENTS

| | | | |
|---|---|---|---|
| 2,193,941 | 3/1940 | Seebach | 156—283 |
| 2,674,488 | 4/1954 | Lyijynen et al. | 296—54 |
| 2,675,330 | 4/1954 | Schwartz et al. | 117—17 |
| 2,711,985 | 6/1955 | Olson. | |
| 2,746,898 | 5/1956 | Buckwalter et al. | 156—283 |
| 2,768,026 | 10/1956 | Stephens et al. | 296—137 |
| 2,823,951 | 2/1958 | Stohl | 296—137 |
| 3,039,459 | 6/1962 | Scholl | 161—161 X |
| 3,042,446 | 7/1962 | Stohl | 296—137 |
| 3,087,571 | 4/1963 | Kerwin | 161—68 X |

FOREIGN PATENTS 760,611  2/1955  Great Britain.

BENJAMIN HERSH, *Primary Examiner.*

EARL M. BERGERT, A. HARRY LEVY, *Examiners.*